US009567956B2

(12) United States Patent
Oohashi

(10) Patent No.: US 9,567,956 B2
(45) Date of Patent: Feb. 14, 2017

(54) FUEL PUMP MODULE

(71) Applicant: DENSO CORPORATION, Kariya, Aichi-pref. (JP)

(72) Inventor: Masaharu Oohashi, Takahama (JP)

(73) Assignee: DENSO CORPORATION, Kariya (JP)

( * ) Notice: Subject to any disclaimer, the term of this patent is extended or adjusted under 35 U.S.C. 154(b) by 203 days.

(21) Appl. No.: 14/470,198

(22) Filed: Aug. 27, 2014

(65) Prior Publication Data

US 2015/0059709 A1 Mar. 5, 2015

(30) Foreign Application Priority Data

Aug. 28, 2013 (JP) .................................. 2013-176886

(51) Int. Cl.
*F02M 37/04* (2006.01)
*F02M 39/02* (2006.01)
(Continued)

(52) U.S. Cl.
CPC .............. *F02M 39/02* (2013.01); *B60K 15/03* (2013.01); *F02M 37/0088* (2013.01); *F02M 37/106* (2013.01); *F02M 37/18* (2013.01); *F02M 37/22* (2013.01); *F02M 69/046* (2013.01); *B60K 2015/0325* (2013.01); *B60K 2015/03118* (2013.01); *B60K 2015/03138* (2013.01);
(Continued)

(58) Field of Classification Search
CPC .... F02M 39/02; F02M 37/0088; F02M 37/22; F02M 37/0047; F02M 37/04; F02M 37/10; F02M 37/18

USPC .................................................. 123/495, 509
See application file for complete search history.

(56) References Cited

U.S. PATENT DOCUMENTS

2005/0241617 A1* 11/2005 Kojima ............... F02D 41/3094
123/446
2006/0065246 A1* 3/2006 Zdroik ............... B01D 35/0273
123/497

(Continued)

FOREIGN PATENT DOCUMENTS

JP 2006-125248 5/2006
JP 2009-228653 10/2009

(Continued)

OTHER PUBLICATIONS

U.S. Appl. No. 14/470,004, filed Aug. 27, 2014 in the name of Masaharu Oohashi.

(Continued)

*Primary Examiner* — Lindsay Low
*Assistant Examiner* — Syed O Hasan
(74) *Attorney, Agent, or Firm* — Nixon & Vanderhye P.C.

(57) ABSTRACT

A fuel pump module for a fuel tank providing improved rigidity includes a first module and a second module. The first module includes a first tank having a first tank room, a direct injection (DI) fuel pump and filter, a port injection (PI) fuel pump and filter, a subtank, and a first flange supporting the filter, the pump, and the like. The second module includes a second tank having a second tank room where fuel is stored separately from the first tank room, a PI filter, a second jet pump, a second flange supporting the filter, the pump, and the like. As a result, a size of two flanges supporting two fuel pumps and two filters is reduced, thereby, reducing a size of two openings of the fuel tank.

8 Claims, 7 Drawing Sheets

(51) Int. Cl.
*B60K 15/03* (2006.01)
*F02M 37/00* (2006.01)
*F02M 37/10* (2006.01)
*F02M 37/18* (2006.01)
*F02M 37/22* (2006.01)
*F02M 69/04* (2006.01)
*F02D 41/30* (2006.01)

(52) U.S. Cl.
CPC ............ *B60K 2015/03236* (2013.01); *B60K 2015/03243* (2013.01); *F02D 41/3094* (2013.01)

(56) References Cited

U.S. PATENT DOCUMENTS

2006/0065249 A1* 3/2006 Powell .............. F02M 37/0017
                                                        123/510
2007/0023014 A1* 2/2007 Betz .................... B60K 15/077
                                                        123/509
2008/0184971 A1* 8/2008 Lubinski ............ F02M 37/0058
                                                        123/511

FOREIGN PATENT DOCUMENTS

| JP | 2009-243330 | 10/2009 |
| JP | 2012-229674 | 11/2012 |
| JP | 2013-096252 | 5/2013 |

OTHER PUBLICATIONS

U.S. Appl. No. 14/470,090, filed Aug. 27, 2014 in the name of Masaharu Oohashi.
U.S. Appl. No. 14/469,930, filed Aug. 27, 2014 in the name of Masaharu Oohashi.
U.S. Appl. No. 14/469,965, filed Aug. 27, 2014 in the name of Masaharu Oohashi.
Office Action (2 pages) dated Jul. 9, 2015, issued in corresponding Japanese Application No. 2013-176886 and English translation (3 pages).

* cited by examiner

FUEL PUMP MODULE

CROSS REFERENCE TO RELATED APPLICATION

The present application is based on and claims the benefit of priority of Japanese Patent Application No. 2013-176886, filed on Aug. 28, 2013, the disclosure of which is incorporated herein by reference.

TECHNICAL FIELD

The present disclosure generally relates to a fuel pump module.

BACKGROUND INFORMATION

Conventionally, a pump module may utilize a plurality of pumps with each pump having respectively different discharge pressures according to an engine operation state, for achieving a high output of the engine and/or for an improvement of the fuel mileage. That is, a patent document 1 (i.e., Japanese Patent No. JP-A-2005-315174) discloses a pump module that includes a direct injection (DI) fuel pump for discharging fuel directly into a combustion chamber of an engine, a DI filter for removing foreign substance from the fuel that is discharged from the DI fuel pump, a port injection (PI) fuel pump for discharging fuel into an air-intake system of the engine, and a PI filter for removing foreign substance from the fuel that is discharged from the PI fuel pump.

In the fuel pump module of the patent document 1, the DI fuel pump, the DI filter, the PI fuel pump, and the PI filter are structurally supported by only a single flange for organizing and housing the components in an inside of a fuel tank. As a result, the flange disposed at an opening of the fuel tank may have a relatively large size for providing support for the two pumps and two filters (i.e., for serving as a base of those parts), which causes the opening of the fuel tank to be relatively large. As a result, the rigidity of the fuel tank having a relatively large opening is low. Further, even when two relatively small fuel tanks are used for the fitting of the fuel pump module according to a certain layout of vehicle components, the relatively small fuel tanks cannot be accommodated by the relatively large flange.

SUMMARY

It is an object of the present disclosure to provide a fuel pump module which improves the rigidity of a fuel tank.

In an aspect of the present invention, a fuel pump module supplies fuel from a fuel tank to an internal-combustion engine. The fuel tank has a first opening and a second opening. The fuel pump module includes a first pump discharging fuel from the fuel tank to a combustion chamber of the internal-combustion engine, a first filter removing foreign substance from fuel that is discharged from the first pump, and a first supply port disposed at a position between the first filter and the combustion chamber and allowing fuel that is filtered by the first filter to flow therethrough. The fuel pump module also includes a second pump discharging fuel from the fuel tank to an air-intake system of the internal-combustion engine, a second filter removing foreign substance from fuel that is discharged from the second pump, a second supply port disposed at a position between second filter and the air-intake system and allowing fuel that is filtered by the second filter to flow therethrough. Further, the fuel pump module includes a first flange disposed to close the first opening of the fuel tank and supporting at least one of the first pump, the second pump, the first filter, or the second filter, and a second flange disposed to close the second opening of the fuel tank and supporting at least one of an other of the first pump, the second pump, the first filter, or the second filter.

The fuel pump module of the present disclosure is provided with the first pump, the first filter, and the first supply port for the supply of the fuel to a combustion chamber of an internal-combustion engine, and is also provided with the second pump, the second filter, and the second supply port for the supply of the fuel to an air-intake system of the internal-combustion engine. In the fuel pump module of the present disclosure, there are two flanges which provides support for the first pump, the second pump, the first filter, and the second filter, and the first pump, the second pump, the first filter, and the second filter respectively are supported by at least one of the two flanges. Thereby, compared with a case where one flange provides support for all of the first pump, the second pump, the first filter, and the second filter, a size of the flange and a size of an opening formed on the fuel tank are reduced. Therefore, the rigidity of the fuel tank is improved.

Further, when two pumps and two filters are supported by only a single flange in a small-size pump module, a structure of such a fuel pump module may become complex, which increases the number of steps required for assembly. However, the fuel pump module of the present disclosure has a simple structure due to a use of two flanges supporting the pumps and filters, thereby reducing the number of steps of the assembly work.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, the embodiment of the present disclosure is described based on the drawings.

One Embodiment

Figure 1:
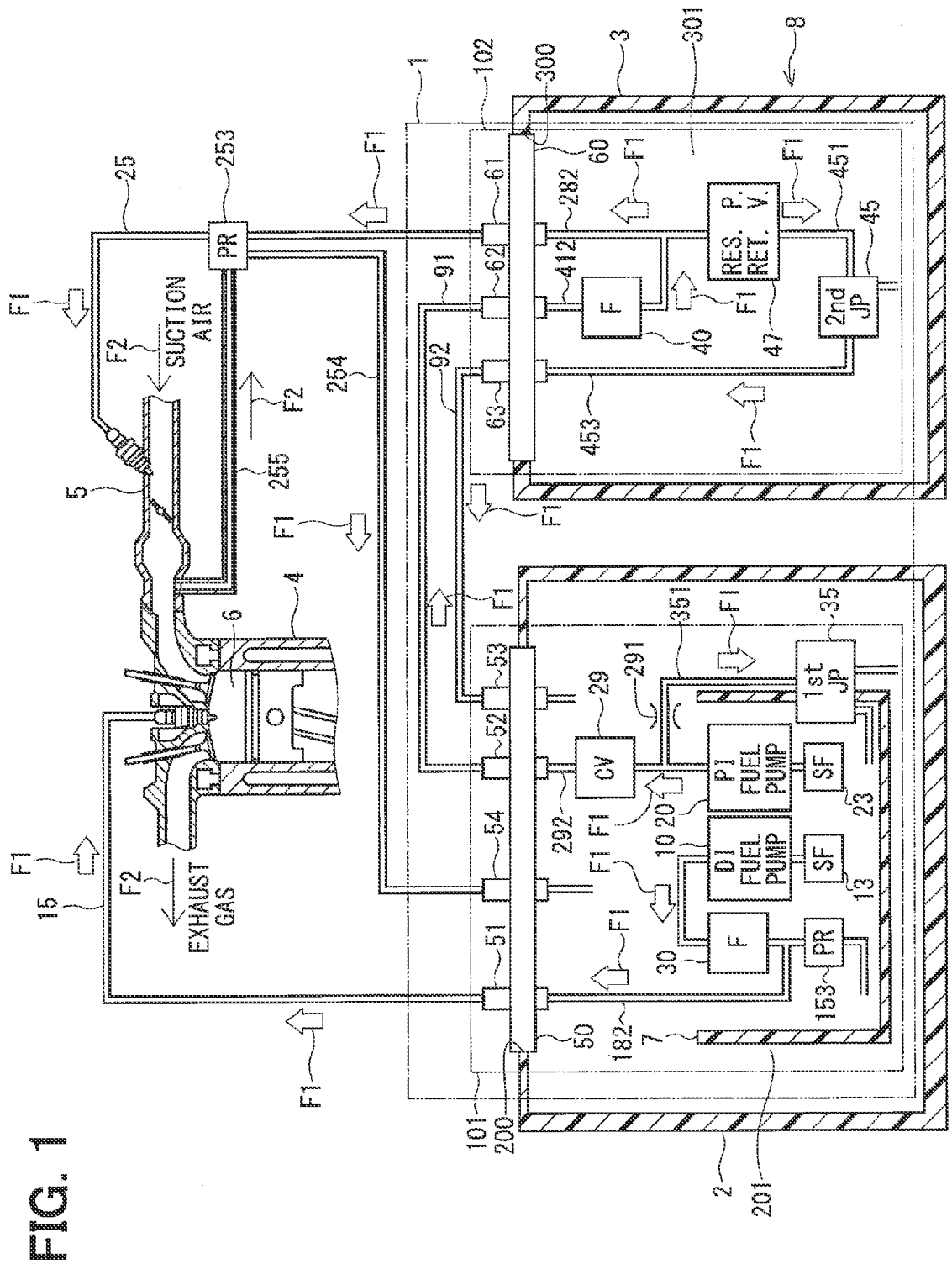
FIG. 1 is a block diagram of a system of a fuel pump module in one embodiment of the present disclosure.

The block diagram explaining a system of a fuel pump module 1 in one embodiment of the present disclosure is shown in FIG. 1. The fuel pump module 1 supplies, to an engine 4, a fuel stored by a fuel tank 8 which has two "fuel reservoir rooms", i.e., a first tank room 201 and a second tank room 301. The fuel pump module 1 supplies, to either one of a combustion chamber 6 of the engine 4 or an air-intake system 5 which is connected to the engine 4, the fuel in different pressures according to a drive state of the engine 4. The fuel pump module 1 is, as shown in FIG. 1, comprised of a first module 101 and a second module 102 together with other parts such as transport pipes 91 and 92 etc. by which the first module 101 and the second module 102 are connected for flowing the fuel back and forth between a first tank 2 and a second tank 3. Further, a white arrow F1 in FIG. 1 shows a flow of the fuel. Further, a solid line arrow F2 in FIG. 1 shows a flow of a gas.

The first module 101 is disposed in the first tank 2. The first module 101 pressurizes the fuel in the first tank 2, and supplies the pressurized fuel to the engine 4, or transports it to the second tank 3. The first module 101 comprises a suction filter 13, a direct injection fuel pump 10 (i.e., hereafter designated as a "DI fuel pump 10"), a suction filter 23, a port injection fuel pump 20 (i.e., hereafter designated as a "PI fuel pump 20"), a direct injection filter 30 (i.e., hereafter designated as a "DI filter 30"), a first jet pump 35, a first flange 50, a subtank 7, and other parts. The DI fuel pump 10 is equivalent to a "first pump" in the claims. The PI fuel pump 20 is equivalent to a "second pump" in the claims. The DI filter 30 is equivalent to a "first filter" in the claims.

Figure 4:
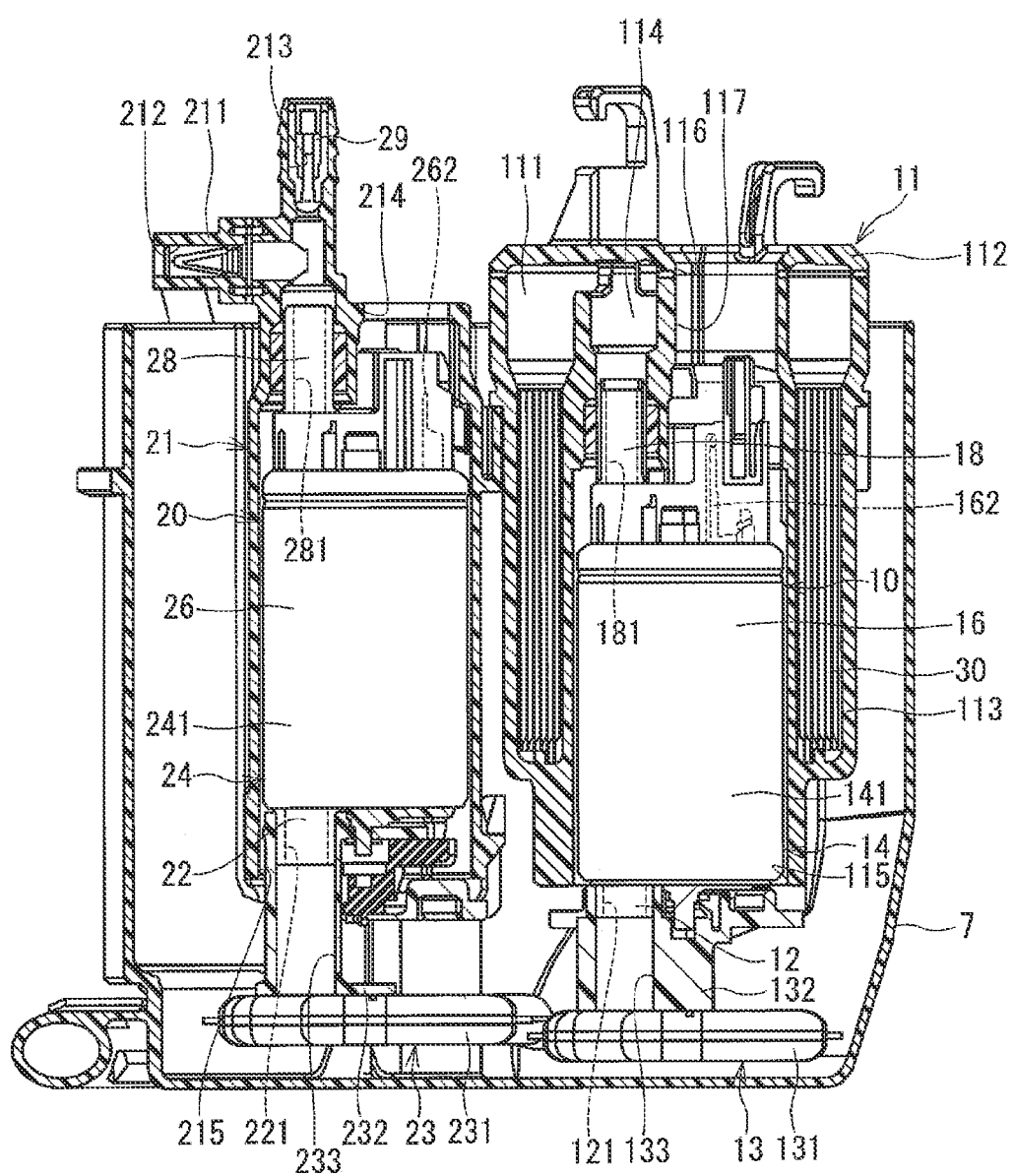
FIG. 4 is a sectional view of the first module in the fuel pump module in one embodiment of the present disclosure.

Referring to FIG. 4, the suction filter 13 comprises a saccate element part 131, a cylindrical connection part 132, etc. The suction filter 13 removes foreign substance from the fuel in the subtank 7 by using the element part 131. The connection part 132 is disposed at a position between the saccate element part 131 and the suction part 12 of the DI fuel pump 10, and is connected to the suction part 12. The connection part 132 providing a connection port 133 allows a communication between an inside of the element part 131 and a suction port 121 of the suction part 12 of the DI fuel pump 10.

The DI fuel pump 10 is an electromotive pump disposed in the subtank 7 that is accommodated in the first tank 2. The DI fuel pump 10 pressurizes the fuel in the subtank 7 to 500 kPa, for example, and directly supplies the pressurized fuel to the combustion chamber 6 of the engine 4 via a direct injection supply pipe 15 (i.e., hereafter designated as a "DI supply pipe 15") that leads to a direct injection supply port 51 (i.e., hereafter designated as a "DI supply port 51") that is disposed on the first flange 50. In the fuel pump module 1 in one embodiment, it is configured that an amount of the fuel supplied from the DI fuel pump 10 to the engine 4 is greater than an amount of the fuel supplied from the PI fuel pump 20 to the engine 4. The DI fuel pump 10 comprises the suction part 12, a pump part 14, a motor part 16, a discharge part 18, and the like. The DI supply port 51 is equivalent to a "first supply port" in the claims.

The suction part 12 is disposed on a filter side (i.e. close to the suction filter 13) of the DI fuel pump 10, and is connected to the pump part 14 of the DI fuel pump 10. The suction part 12 has the suction port 121. The suction port 121 allows communication between an inside of the suction filter 13 and an inside of the pump part 14. The suction port 121 is disposed at an away-from-axis position (i.e., a position that is different from a position of an axis of the DI fuel pump 10), and sends the fuel in the subtank 7 via the suction filter 13 to the pump part 14.

The pump part 14 comprises an impeller which is not illustrated, a pump case 141 which forms a pump room in which the impeller is rotatably accommodated, together with other parts. The pump room allows communication between the suction port 121 of the suction part 12 and a discharge port 181 of the discharge part 18.

The motor part 16 is a brushless motor which comprises a stator, a rotor, a shaft, and the like, all of which are not illustrated. When an electric power is supplied to a not-illustrated winding which is wound on a cylindrical stator via a wire harness 161 (see FIG. 2) and a power supply terminal 162, a rotor positioned in an inside of the stator rotates together with the shaft. A rotation torque of the shaft is transmitted to the impeller of the pump part 14. In such manner, the impeller of the pump part 14 rotates, the fuel in the pump room is pressurized, and the pressurized fuel is sent to the discharge part 18.

The discharge part 18 is disposed on an opposite side of the suction part 12 relative to the pump part 14 and the motor part 16. The discharge part 18 has the discharge port 181 which allows communication between an inside of the pump part 14 and an inside of the pump case 11. The fuel pressurized by the pump part 14 is sent to a fuel passage 111 that is formed in an inside of the pump case 11 via the discharge port 181.

The pump case 11 is a cylindrical member having a bottom, which is made of resin. The pump case 11 comprises a bottom part 112, a side part 113, a connection part 119, and the like. The DI fuel pump 10 and the DI filter 30 are accommodated in an inside of the pump case 11.

The bottom part 112 is formed substantially in a disk shape from resin. A through hole 116 is disposed on the bottom part 112 substantially in parallel with an axis of the DI fuel pump 10. The through hole 116 accepts a connector to be electrically connected to the power supply terminal 162 of the motor part 16 inserted therein.

Referring to FIG. 4, the side part 113 has (i) a cylindrical space with a bottom, or a one-end-closed cylinder, with two openings, i.e., an opening 117 in communication with the through hole 116 of the bottom part 112 and an opening 115 that is formed on a filter side that is close to the filter 13, and (ii) a donut shape space, or a ring shape space, that is positioned on a radially-outer portion of the cylindrical space. In the one-end-closed cylinder, the DI fuel pump 10 is housed. The DI fuel pump 10 is housed in the one-end-closed cylinder through the opening 115. Further, through the opening 117, a connector that is electrically connected with the power supply terminal 162 is housed. At a position that corresponds to the discharge port 181 of the side part 113, a connection chamber 114 is formed for communication between the discharge port 181 and the fuel passage 111. The fuel discharged from the discharge port 181 flows through the connection chamber 114 and is sent into the fuel passage 111.

In the donut shape space of the side part 113, the DI filter 30 is housed substantially in a cylindrical shape. The DI filter 30 is made of a conductive resin which does not contain carbon, for example, and removes foreign substance from the fuel that is discharged from the discharge port 181. The fuel passing through the DI filter 30 is sent into the connection part 119 that is disposed on a radially-outer portion of the pump case 11.

The connection part 119 is disposed on a radially-outer portion of the side part 113, and houses a pressure regulating valve 153. The pressure of the fuel sent to the connection part 119 is adjusted to a desired value by the pressure regulating valve 153. The pressure adjusted fuel is then sent to an outside of the first tank 2 via a supply pipe 182 (see FIG. 1) and the DI supply port 51 that is disposed on the first flange 50.

The suction filter 23 includes a saccate element 231, a connection part 232 substantially in a cylindrical shape, and the like. The suction filter 23 removes foreign substance from the fuel in the subtank 7 by using the element 231. The connection part 232 is disposed at a position between the element 231 and a suction part 22 of the PI fuel pump 20, and is connected to the suction part 22. A connection port 233, which is provided by the connection part 232, allows communication between an inside of the element 231 and a suction port 221 which is a part of the suction part 22 of the PI fuel pump 20.

The PI fuel pump 20 is an electromotive pump disposed in the subtank 7 of the first tank 2 similar to the DI fuel pump 10. The PI fuel pump 20 pressurizes the fuel in the subtank 7 to an arbitrary pressure level between 350 and 500 kPa, for example, and sends the fuel to the second tank 3 via a transport pipe 91 that leads to a transport port 52 disposed on the first flange 50, and, at the same time, supplies the pressurized fuel to the first jet pump 35 that is mentioned later. The PI fuel pump 20 comprises the suction part 22, a pump part 24, a motor part 26, a discharge part 28, and the like.

The suction part 22 is disposed on a filter side of the PI fuel pump 20, close to the suction filter 23, of the PI fuel pump 20, and is connected to the pump part 24 of the PI fuel pump 20. The suction part 22 has the suction port 221. The suction port 221 allows communication between an inside of the suction filter 23 and an inside of the pump part 24. The suction port 221 is disposed at an away-from-axis position, i.e., a position that is different from a position of an axis of the PI fuel pump 20, and sends the fuel in the subtank 7 via the suction filter 23 to the pump part 24.

The pump part 24 comprises an impeller which is not illustrated, a pump case 241 which forms a pump room, in which the impeller is rotatably accommodated, together with other parts. The pump room allows communication between the suction port 221 of the suction part 22 and a discharge port 281 of the discharge part 28.

The motor part 26 is a brushless motor which includes a stator, a rotor, a shaft, and the like, all of which are not illustrated. When an electric power is supplied to a not-illustrated winding which is wound on a cylindrical stator via a wire harness 261 (see FIG. 2) and a power supply terminal 262, a rotor provided in an inside of the stator rotates together with the shaft. A rotation torque of the shaft is transmitted to the impeller of the pump part 24. In such manner, the impeller of the pump part 24 rotates, the fuel in the pump room is pressurized, and the pressurized fuel is sent to the discharge part 28.

The discharge part 28 is disposed on an opposite side of the suction part 22 relative to the pump part 24 and the motor part 26. The discharge part 28 has the discharge port 281 which allows communication between an inside of the pump part 24 and an inside of the pump case 21. The discharge part 28 is connected to a connection part 211 that is formed in an inside of the pump case 21. The fuel pressurized by the pump part 24 is sent to the connection part 211 through the discharge port 281.

The pump case 21 is a cylindrical member having a bottom, which is made of resin. On one side of the pump case 21 closer to the suction filter 23, an opening 215 is formed. The PI fuel pump 20 is inserted into an inside of the pump case 21 through the opening 215.

The connection part 211 disposed on an opposite side of the pump case 21 relative to the suction filter 23 has a flow passage that branches into two directions. One of the two branches, i.e., a flow passage 212, communicates with an inside of the first jet pump 35 via a supply pipe 351 (see FIG. 1 and FIG. 2) having an orifice 291. The other one of the two branches, i.e., a flow passage 213 houses a non-return valve 29 that regulates a flow of the fuel in one way. The fuel flowing in the other passage 213 is sent to an outside of the first tank 2 via a transport pipe 292 (see FIG. 1 and FIG. 2) and the transport port 52 disposed on the first flange 50.

At a position on an opposite side of the pump case 21 that is opposite to the suction filter 23, a through hole 214 is formed, which is a different position from the connection part 211. Through the through hole 214, a connector that is electrically connected with a power supply terminal 262 of the motor part 26 is inserted/installed.

Figure 2:
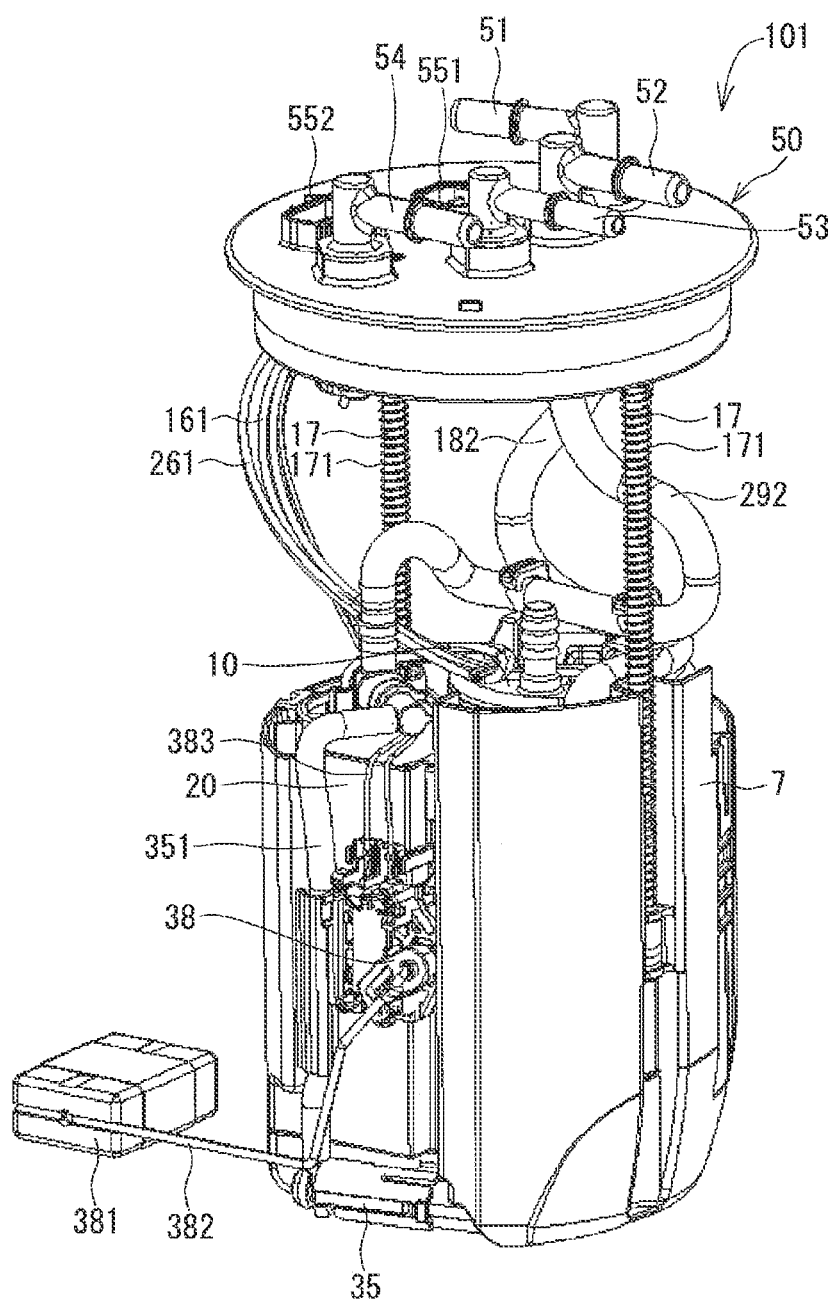
FIG. 2 is a perspective view of a first module in the fuel pump module in one embodiment of the present disclosure.

As shown in FIG. 2, the first jet pump 35 is disposed on the other end of the module 101 relative to the first flange 50, at a radially-outer portion position of the subtank 7. The first jet pump 35 introduces the fuel from the first tank room 201 to the subtank 7 with a help of the pressure of the discharged fuel from the PI fuel pump 20. In other words, the first jet pump 35 is in fluid communication with the PI fuel pump 20 such that the first jet pump 35 suctions fuel according to pressure from the PI fuel pump 20.

Figure 3:
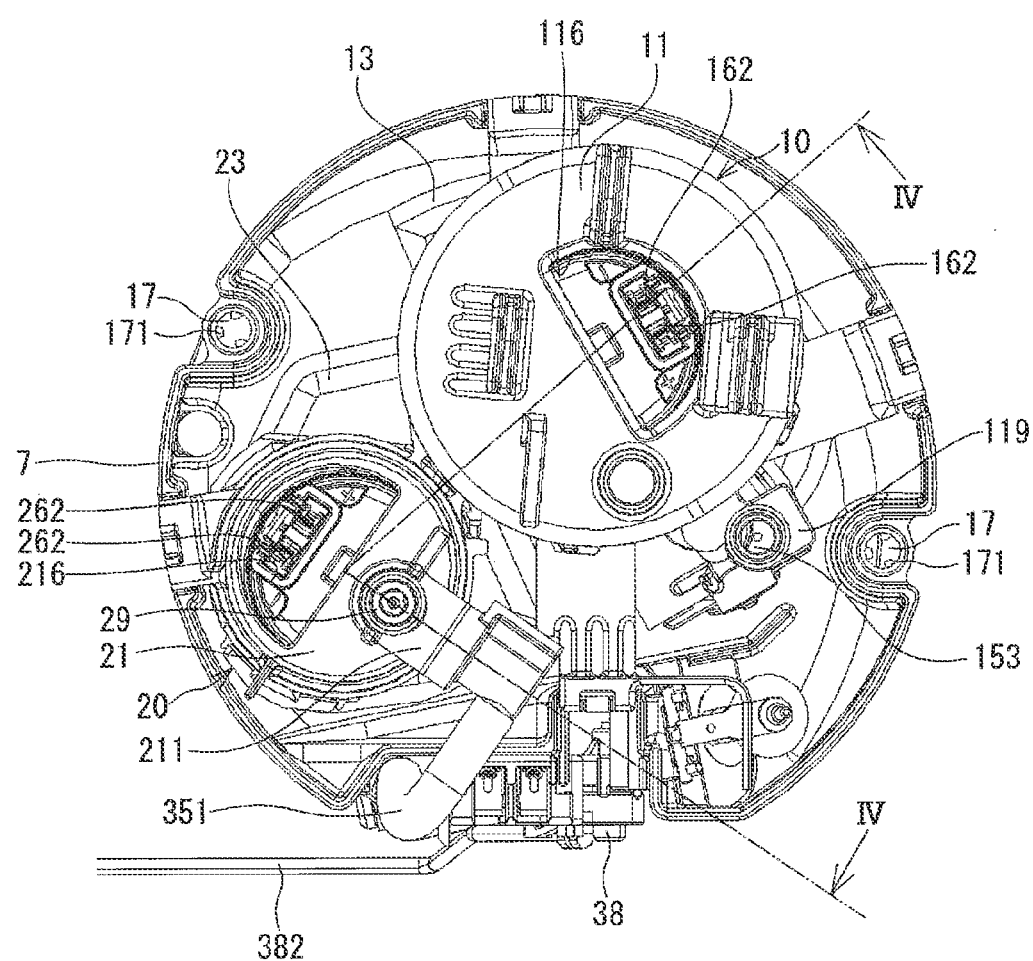
FIG. 3 is a top view of the first module in the fuel pump module in one embodiment of the present disclosure.

A sender gauge 38 is disposed at a radially-outer portion of the subtank 7, as shown in FIGS. 2 and 3. The sender gauge 38 is connected with a float 381 via an arm 382. When the float 381 moves according to a change of a fuel level, the arm 382 rotates, and the fuel level is detected based on a detection of the rotation amount of the arm 381 by the sender gauge 38. The sender gauge 38 outputs a fuel-level detection signal via a wire harness 383 and the first flange 50 to a non-illustrated electrical control unit (i.e., hereafter an "ECU") which is disposed externally to the module 101.

The first flange 50 is formed in a disk shape, and is positioned on an opening 200 of the first tank 2, which is a "first opening" and serves as a cover of the opening 200 (see FIG. 1). In other words, the first flange 50 is disposed to close the first opening 200 of the first tank 2. A transport port 53 through which the fuel flows from the second tank 3 to the subtank 7 is provided on the first flange 50. A reflux port 54 which allows a reflux of the fuel flowing from a pressure regulating valve 253 disposed in a port injection supply pipe 25 (i.e., hereafter a "PI supply pipe 25") back to the subtank 7 is also provided on the first flange 50. In addition, the DI supply port 51 and the transport port 52 are also provided on the first flange 50. Further, an external connector 551 and an external connector 552 are disposed on the first flange 50. The external connector 551 is electrically connected to the wire harnesses 161 and 261 and supplies an electric power to the DI fuel pump 10 and the PI fuel pump 20. The external connector 552 outputs to an outside of the module 1 a signal of the fuel level which is detected by the sender gauge 38 via the wire harness 383.

The subtank 7 is formed in a bottom-closed cylindrical shape and is made from resin. The subtank 7 houses the DI fuel pump 10, the PI fuel pump 20, and the like, as mentioned above, and, on a radially-outer portion of the subtank 7, the first jet pump 35 and the sender gauge 38 are disposed.

As shown in FIG. 2, the first flange 50 and the subtank 7 are connected by two shafts 17 so that a relative position of the two (i.e., the flange 50 and the subtank 7) is changeable. On a radially-outer portion of the shaft 17, a spring 171 biasing the first flange 50 and the subtank 7 away from each other is disposed. Thereby, the subtank 7 is pressed against a bottom of the first tank 2.

The second module 102 is disposed in the second tank 3. The second module 102 removes foreign substance from the fuel that is sent from the first tank 2 and supplies the fuel to the engine 4, and/or transports the fuel in the second tank 3 to the first tank 2 with a help of the pressure of the fuel that is sent from the first tank 2. The second module 102 is provided with a port injection filter 40 (i.e., hereafter a "PI filter 40"), a filter case 41, a residual pressure maintenance valve 47, a second jet pump 45, a second flange 60, and the like. The PI filter 40 is equivalent to a "second filter" in the claims.

The PI filter 40 is substantially formed in a cylindrical shape, and is housed in the donut shape space in the filter case 41, that has the same shape as the pump case 11 housing the DI fuel pump 10. The PI filter 40 is, for example, made from a conductive resin which does not contain carbon. The PI filter 40 removes foreign substance from the fuel that is sent from the first tank 2.

Figure 7:
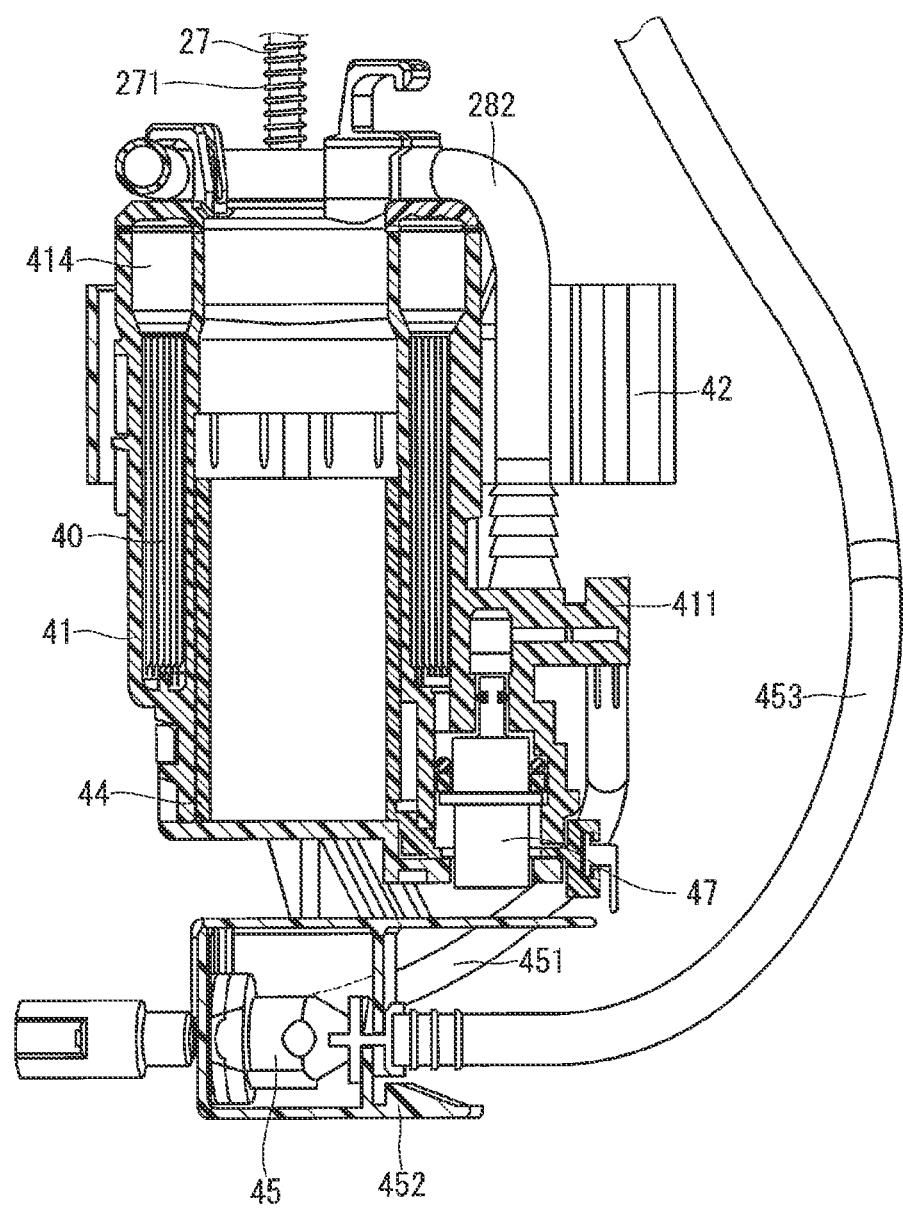
FIG. 7 is a sectional view of the second module in the fuel pump module in one embodiment of the present disclosure.

The filter case 41 is supported by an outer bracket 43 via a ring-shape inner bracket 42 that is substantially in a ring shape. As shown in FIG. 7, a ground bracket 44 grounded to a ground is housed in a cylindrical space that is formed substantially at the center of the filter case 41.

The filter case 41 has, disposed thereon, a transport pipe 412 and a transport port 413, which introduce the fuel from the first tank 2 via a transport port 62 on the second flange 60 into an inside of the case 41. The fuel introduced into the filter case 41 through the transport port 413 passes through a fuel passage 414 and the PI filter 40 in an inside of the filter case 41. The fuel passing through the PI filter 40 is supplied to the air-intake system 5 of the engine 4 via a supply pipe 282, a port injection supply port 61 (i.e., hereafter a "PI supply port 61") disposed on the second flange 60, and the PI supply pipe 25 connected to the PI supply port 61. Further, a part of the fuel which passes the PI filter 40 is introduced into the residual pressure maintenance valve 47 that is housed in a radially-outer portion of the filter case 41. The PI supply port 61 is equivalent to a "second supply port" in the claims.

The residual pressure maintenance valve 47 is housed in a connection part 411 disposed on a radially-outer portion of the filter case 41, as shown in FIG. 7. The residual pressure maintenance valve 47 maintains a pressure of the fuel in an inside of the PI filter 40, which is disposed on an upstream side of the valve 47, at a certain level such as 320 kPa, for example, and prevents the fuel in the PI filter 40 from evaporating. The fuel passing through the residual pressure maintenance valve 47 is sent to the second jet pump 45 that serves as a "fuel transport unit" through a supply pipe 451.

The second jet pump 45 is housed in a subtank 452 that is disposed on an opposite side of the second flange 60 relative to the outer bracket 43 (i.e., an opposite end of the module 102 relative to the second flange 60). The second jet pump 45 is a so-called push-down type jet pump, and suctions the fuel from the second tank 3 with a help of the pressure of the fuel sent from the residual pressure maintenance valve 47. The fuel suctioned by the second jet pump 45 is sent to an outside of the second tank 3 via a transport pipe 453 and a transport port 63 that is disposed on the second flange 60.

Figure 5:
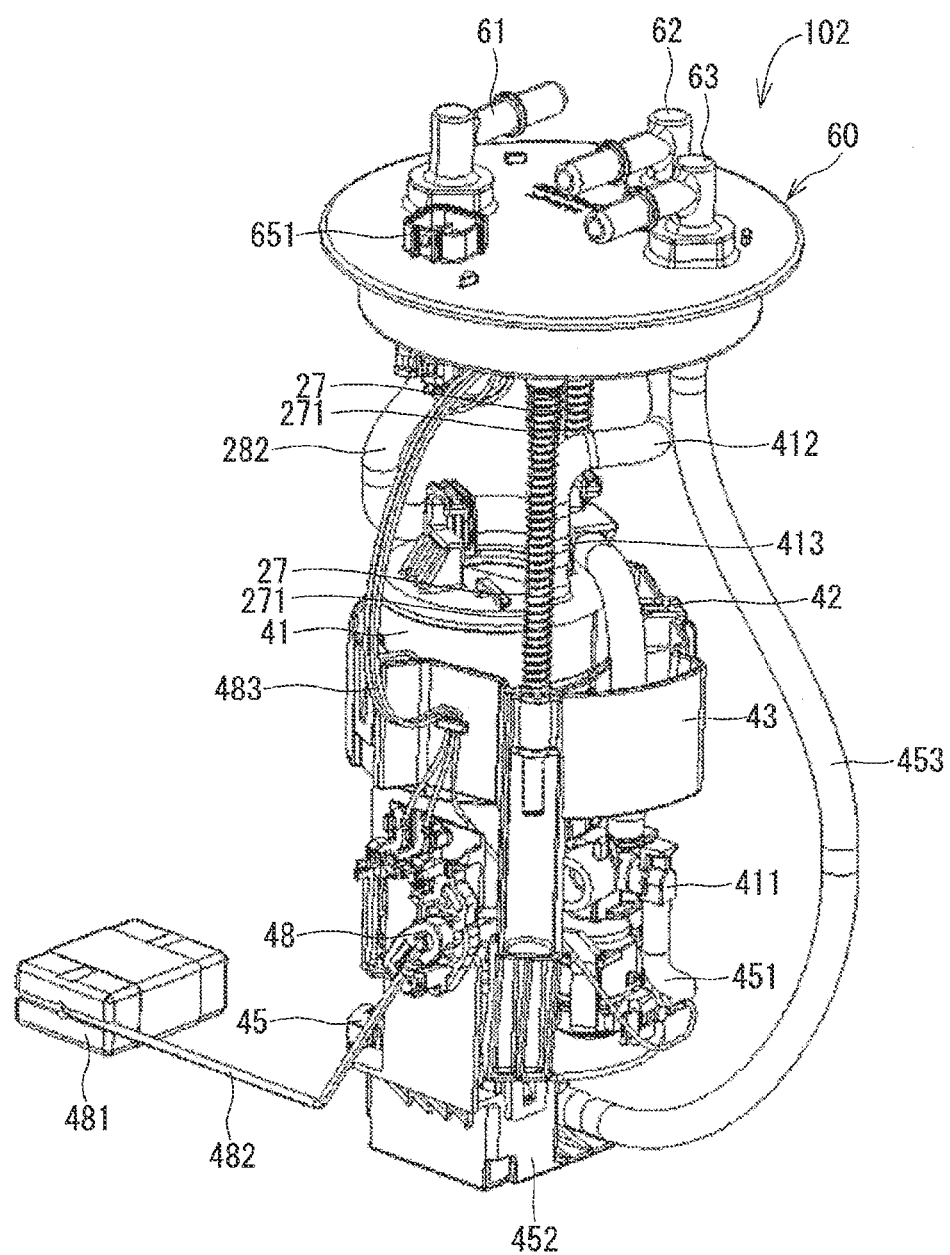
FIG. 5 is a perspective view of a second module in the fuel pump module in one embodiment of the present disclosure.
Figure 6:
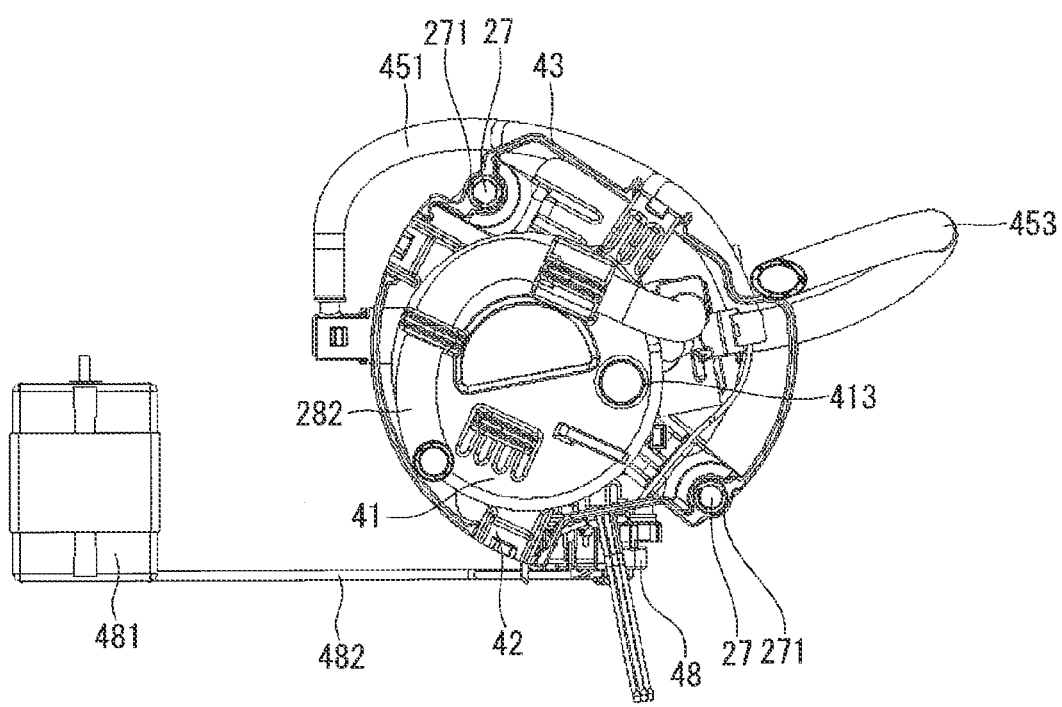
FIG. 6 is a top view of the second module in the fuel pump module in one embodiment of the present disclosure.

A sender gauge 48 is disposed on a radially-outer portion of the filter case 41, as shown in FIG. 5. The sender gauge 48 is connected to a float 481 via an arm 482. When the float 481 moves according to a change of a fuel level, the arm 482 rotates, and a fuel level is detected based on a detection of the rotation amount of the arm 482 by the sender gauge 48. The sender gauge 48 outputs a fuel-level detection signal via the second flange 60 to the ECU that is external to the module 102.

The second flange 60 is formed in a disk shape, and it is positioned on an opening 300 of the second tank 3, which is a "second opening", and serves as a cover of the opening 300. In other words, the second flange 60 is disposed to close the second opening 300 of the second tank 3. On the second flange 60, the PI supply port 61 as well as transport ports 62 and 63 are disposed. Further, on the second flange 60, an external connector 651 which outputs a fuel level signal detected by the sender gauge 48 via a wire harness 483 to an outside of the module 102 is disposed.

In the fuel pump module 1, the transport port 52 on the first flange 50 and the transport port 62 on the second flange 60 are connected with each other by the transport pipe 91 through which the fuel flows from the first tank 2 to the second tank 3. Further, the transport port 53 on the first flange 50 and the transport port 63 on the second flange 60 are connected with each other by the transport pipe 92 through which the fuel flows from the second tank 3 to the first tank 2. In such manner, the fuel in the second tank 3 is transported to the first tank 2 in which two fuel pumps are provided, and the fuel in both of the first tank 2 and the second tank 3 is securely supplied to the engine 4.

The second flange 60 and the filter case 41 are connected by two shafts 27 as shown in FIG. 5. On a radially-outer portion of the shaft 27, a spring 271 biasing the second flange 60 and the filter case 41 away from each other is disposed. Thereby, the filter case 41 is pressed against a bottom of the second tank 3 by the spring 271 which biases the case 41 away from the second flange 60.

The operation of the fuel pump module 1 is described in the following.

If an electric power is supplied from outside of the module 1 to the DI fuel pump 10 and the PI fuel pump 20 via the external connector 551, the DI fuel pump 10 and the PI fuel pump 20 are driven, and the fuel in the subtank 7 is suctioned via the suction filters 13 and 23 and is pressurized.

In the DI fuel pump 10, foreign substance is removed from the fuel that is discharged from the pump part 14 by the DI filter 30 that is housed in the pump case 11. After the removal of foreign substance from the fuel by the DI filter 30, the pressure of the fuel is adjusted to a more suitable value by the pressure regulating valve 153, and the fuel having a suitable pressure is directly supplied to the combustion chamber 6 of the engine 4 through the supply pipe 182, the DI supply port 51 on the first flange 50 and the DI supply pipe 15.

On the other hand, in the PI fuel pump 20, the fuel discharged from the pump part 24 is in part transported into the second tank 3 through the transport pipe 492, the transport port 52 on the first flange 50, the transport pipe 91, the transport port 62 on the second flange 60, and the transport pipe 412, after passing through a non-return valve 49. Further, the fuel discharged from the pump part 24 is in part supplied to the first jet pump 35 through the supply pipe 351. The first jet pump 35 introduces the fuel from the first tank 2 into the subtank 7 with a help of the pressure of the supplied fuel.

Foreign substance is removed from the pressurized fuel, which is transported from the first tank 2 to the second tank 3 through the transport pipe 91, by the PI filter 40. The fuel passing through the PI filter 40 is in part supplied to the air-intake system 5 of the engine 4 through a supply pipe 282, the PI supply port 61 on the second flange 60, and the PI supply pipe 25. At this time, the pressure of the supplied fuel passing through the PI supply pipe 25 is adjusted by the pressure regulating valve 253 according to the pressure of a suction air introduced via a vent pipe 255 which is in communication with the air-intake system 5, for example. The fuel not going to be supplied to the air-intake system 5, due to the pressure adjustment, returns to an inside of the first tank 2 via a return pipe 254 and the reflux port 54 on the first flange 50.

Further, the fuel passing through the PI filter 40 is in part supplied to the second jet pump 45 through the residual pressure maintenance valve 47 and the supply pipe 451. The second jet pump 45 sends the fuel from the second tank 3 to the subtank 7 via the transport pipe 453, the transport port 63 on the second flange 60, the transport pipe 92, and the transport port 53 on the first flange 50 with a help of the pressure of the supplied fuel. Thereby, the fuel of the second tank room 301 is pressurized by the DI fuel pump 10 and the PI fuel pump 20 in the first tank 2, and is supplied to the engine 4.

The fuel pump module 1 in one embodiment of the present disclosure has, as a "fuel reservoir room", the first tank room 201 and the second tank room 301, and, in each of the tank rooms 201 and 301, a flange that gives support for components of the fuel pump module 1 is provided. In the first tank 2, the first module 101 that supports the DI fuel pump 10, the PI fuel pump 20, the DI filter 30 and the like is provided. Further, in the second tank 3 which has the second tank room 301, the PI filter 40 and the second jet pump 45 are provided. Thereby, in the fuel pump module 1, two fuel pumps and two filters for selectively supplying the fuel to the engine 4 in two methods are provided. In such configuration, if one flange supports all, i.e., two pumps and two filters, the size of the flange becomes large, thereby (i) making the size of the opening on the fuel tank larger and (ii) lowering the rigidity of the fuel tank. However, the fuel pump module 1 of the present disclosure is configured to have the two flanges for providing support for the two fuel pumps and two filters, thereby (i) making an opening area size of each of the two openings 200 and 300 relatively small and (ii) increasing the rigidity of the fuel tank.

Further, in the fuel pump module 1 in one embodiment, the leakage of the fuel from the fuel tank 8 to an outside thereof is reduced since the opening area size of each of the two openings 200 and 300 on the fuel tank 8 becomes relatively small.

Further, when the fuel tank is divided into two or more tanks according to the layout of a vehicle, and the volume of the divided fuel tanks may become small. In such case, an opening area size of an opening on the divided fuel tank may be smaller than the sufficient size which is capable of accommodating one/single flange that can support the two fuel pumps and the two filters. However, the fuel pump module 1 in one embodiment of the present disclosure is configured to support two fuel pumps and two filters by using two flanges, thereby enabling a compact arrangement of the relatively small first tank 2 and second tank 3, which makes it possible to formulate an ease-of-assembly arrangement of those tanks 2, 3 and enables reduction of the number of steps of the assembly work.

Further, in the fuel pump module 1, by devising the first tank 2 to accommodate/include the DI filter 30, and the DI supply port 51 together with the DI fuel pump 10 that is in control of a fuel supply to the engine 4, the length of the pipe for supplying the fuel to the combustion chamber 6 is reduced. Therefore, the loss of pressure of the fuel that is supplied to the combustion chamber 6 is reduced, and the size/capacity of the DI fuel pump 10 is thus reduced.

Other Embodiments (a) In the above-mentioned embodiment, the fuel tank is a divided-tank type, in which two tanks, first and second, are in communication through a transport pipe. However, the fuel tank may be other types, such as a saddle-shape tank in which a bottom of the fuel tank is divided into two bottom parts, making each of the two parts respectively serving as a "fuel reservoir room". In such case, "a communication passage for allowing communication between two fuel reservoir rooms (i.e., the two bottom parts)" is a corridor space that is made as a free space with a bottom of a corridor raised from the two bottom parts of the saddle-shape tank. Further, the number of "fuel reservoir rooms" is not necessarily limited to two, but may be three or more.

(b) In the above-mentioned embodiment, the first flange supports the DI fuel pump, the PI fuel pump, and the DI filter, and the DI supply port is provided on the first flange. Further, the second flange supports the PI filter, and the PI supply port is provided on the second flange. However, the combination between two flanges and two fuel pumps/filters/supply ports may be arbitrary. That is, for example, the first flange may support the DI and PI fuel pumps, and the second flange may support the DI and PI filters while having the DI supply port and PI supply port disposed thereon.

(c) In the above-mentioned embodiment, the second jet pump sends the fuel from the second tank room to the first tank room with a help of the pressure of the fuel that is discharged from the PI fuel pump. However, the driving power source of the second jet pump serving as a "fuel transport unit" is not limited to the above.

As mentioned above, the present disclosure is feasible in various forms in a range which is not limited to the above-described embodiment as long as it does not get deviated from the gist of the disclosure.

What is claimed is:

1. A fuel pump module configured to supply fuel from a fuel tank to an internal-combustion engine, the fuel tank having a first opening and a second opening, the fuel pump module comprising:
   a first pump configured to discharge fuel from the fuel tank to a combustion chamber of the internal-combustion engine;
   a first filter configured to remove foreign substance from fuel that is discharged from the first pump;
   a first supply port disposed at a position between the first filter and the combustion chamber and configured to allow fuel that is filtered by the first filter to flow therethrough;
   a second pump configured to discharge fuel from the fuel tank to an air-intake system of the internal-combustion engine;
   a second filter configured to remove foreign substance from fuel that is discharged from the second pump;
   a second supply port disposed at a position between the second filter and the air-intake system and configured to allow fuel that is filtered by the second filter to flow therethrough;
   a first flange that closes the first opening of the fuel tank and that supports at least one of the first pump, the second pump, the first filter, or the second filter;
   a second flange that closes the second opening of the fuel tank and that supports at least an other one of the first pump, the second pump, the first filter, or the second filter; and
   a plurality of tank rooms inside the fuel tank, the plurality of tank rooms including at least a first tank room and a second tank room separately arranged from each other, wherein the first flange closes the first opening located on the first tank room, and the second flange closes the second opening located on the second tank room.

2. The fuel pump module according to claim 1, wherein the first pump is configured to discharge a greater volume of fuel to the internal-combustion engine than the second pump,
the first pump and the first filter are supported by the first flange, and
the first supply port is disposed on the first flange.

3. The fuel pump module according to claim 2, wherein the second filter is supported by the second flange, and
the second supply port is disposed on the second flange.

4. The fuel pump module according to claim 1, further comprising:
a fuel transport unit configured to transport from the first tank room to the second tank room or from the second tank room to the first tank room.

5. The fuel pump module according to claim 4, further comprising:
a jet pump disposed in the fuel transport unit and in fluid communication with the first pump or the second pump to transport fuel from the first tank room to the second tank room, or from the second tank room to the first tank room.

6. The fuel pump module according to claim 4, further comprising:
a transport pipe fluidly connecting the first tank room and the second tank room.

7. The fuel pump module according to claim 1, wherein:
the first flange closes the first opening of the fuel tank and supports the first pump and the second pump, and supports one of the first filter and the second filter; and
the second flange closes the second opening of the fuel tank and supports another of the first filter and the second filter.

8. The fuel pump module according to claim 1, wherein:
the first pump and second pump are located in the first tank room, and the second filter is located in the second tank room.

* * * * *